No. 704,303. Patented July 8, 1902.
T. A. EDISON.
REVERSIBLE GALVANIC BATTERY.
(Application filed Jan. 8, 1901.)
(No Model.)
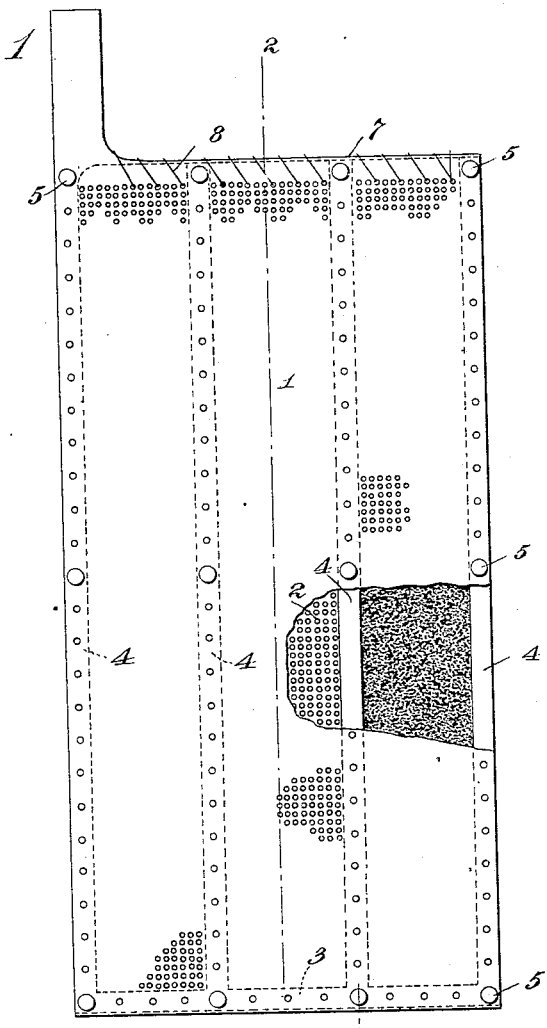
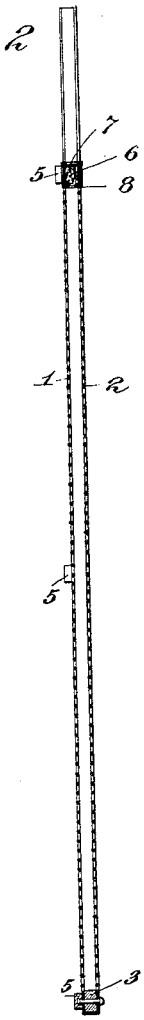
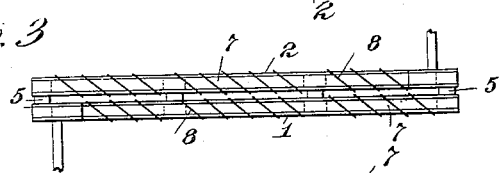
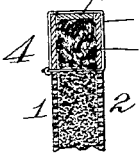
Witnesses:
Jas. F. Coleman
Jno. R. Taylor
Inventor
Thomas A. Edison
by Dyer Edmonds Dyer
Att'ys.

UNITED STATES PATENT OFFICE.

THOMAS A. EDISON, OF LLEWELLYN PARK, NEW JERSEY, ASSIGNOR TO EDISON STORAGE BATTERY COMPANY, A CORPORATION OF NEW JERSEY.

REVERSIBLE GALVANIC BATTERY.

SPECIFICATION forming part of Letters Patent No. 704,303, dated July 8, 1902.

Application filed January 8, 1901. Serial No. 42,514. (No model.)

*To all whom it may concern:*

Be it known that I, THOMAS A. EDISON, a citizen of the United States, residing at Llewellyn Park, in the county of Essex and State of New Jersey, have invented a certain new and useful Improvement in Reversible Galvanic Batteries, (Case No. 1,051,) of which the following is a description.

My invention relates to improvements in reversible galvanic or so-called "storage" batteries; and my object is to produce a reversible galvanic cell of great permanency and of light weight per unit of energy.

The invention consists in the utilization of mercury as the oxygen-storing element in an alkaline solution and preferably one employing zinc; and the invention resides principally in the particular treatment of mercury by which it will be made practically and efficiently useful for the purpose.

It is well known that the black oxid of mercury produced by electrolytically oxidizing metallic mercury covers the mercurial globules so densely as to be practically impermeable to the solution, whereby further oxidation will be resisted. It is therefore impracticable to utilize mercury as the oxygen-storing element of a cell except when it is extremely finely divided, and when in this condition it is essential that after it has given up its oxygen and has resumed its metallic state the various small globules thereof shall be prevented from coalescing or intermingling. In a practicable and commercial storage battery it is desirable that these conditions when once obtained shall not be disturbed by the evolution of gas internally generated when the element is subjected to overoxidation. I construct the oxygen-storing element of a reversible cell using mercury and wherein these ideal conditions will be realized by the employment of perforated nickle plates, forming pockets or receptacles of the same general character as I describe in my application for Letters Patent filed October 31, 1900, Serial No. 34,994, except that the perforations of the pockets are very small, as will be explained.

In the accompanying drawings, forming a part of this specification, Figure 1 is a face view of one of the plates, having three pockets or receptacles, showing the front wall partly broken away. Fig. 2 is a section on the line 2 2 of Fig. 1. Fig. 3 is a plan showing two of the plates forming a single combination, and Fig. 4 an enlarged detailed section.

In all of the above views corresponding parts are represented by the same numerals of reference.

Each plate is formed with two walls 1 and 2, constructed, preferably, of a single continuous sheet made, preferably, of very thin sheet-nickel, say about .005 of an inch in thickness, and bent at its bottom around a horizontal frame 3, from which extend the vertical spacing-frames 4 4, to all of which frames the sheet is secured by means of nickel rivets, as shown, to form a strong rigid hollow plate with pockets or receptacles between the vertical frames 4 4. The walls 1 and 2 of the plate, as shown, are perforated with small holes arranged very closely together and each about .015 of an inch in diameter. I prefer to use nickel in the construction of the plates, since that metal is not oxidizable by electric oxidation in an alkaline solution. Iron, on the other hand, is slightly oxidized under these conditions and is not so desirable; but if very carefully and perfectly plated with nickel it may be used satisfactorily for the construction of either the plates or the frames. Obviously the frames 3 and 4 may be, and in some instances preferably are, constructed of hard rubber or other inert material, to which the perforated sheet is riveted, as explained. Secured to one or both of the sides of the plate are a number of insulated spacing-blocks 5 5 to prevent adjacent plates from touching when immersed in the electrolyte. Into the pockets or receptacles formed between the walls of the plate is packed a composition composed, preferably, of an intimate mixture of flake-graphite and oxids of mercury. On top of the active material is placed a layer of asbestos 6 about a quarter of an inch in thickness, held in place by thin strips of nickel 7 by means of nickel wires 8, as shown. By thus firmly securing the active material in position in the pockets or receptacles any internal generation of gas due to over-oxidation will not agitate or disturb the finely-divided condition of the mercury, while by making the perforations in the walls of the plate smaller than the graphite particles the active material will be prevented from being forced through said openings. An active element constructed as described possesses high efficiency for the storing of oxygen in a reversible galvanic cell. Preferably the element thus constructed is employed with zinc plated, preferably, upon an electrode of metallic magnesium in an electrolyte using an alkaline zincate, as I describe in my application for patent filed October 31, 1900, Serial No. 34,995. The advantage of employing a mercurous element in connection with zinc is that slight traces of mercury which enter into the solution tend to amalgamate the zinc deposited on the magnesium plate and assist the perfect deposition of zinc thereon, while with almost every other oxygen-storing element of which I have knowledge infinitesimal amounts thereof are dissolved in the alkaline solution and produce objectionable local action on the zinc.

Having now described my invention, what I claim as new, and desire to secure by Letters Patent, is as follows:

1. In a reversible galvanic cell employing an alkaline electrolyte, an oxygen-storing element therefor comprising an intimate mixture of finely-divided oxid of mercury and an inert flake-like conducting material, substantially as set forth.

2. In a reversible galvanic cell employing an alkaline electrolyte, an oxygen-storing element therefor comprising an intimate mixture of flake-graphite and oxid of mercury, substantially as set forth.

3. In a reversible galvanic cell employing an alkaline zincate as the electrolyte, an oxygen-storing element containing finely-divided oxid of mercury and an inert flake-like conducting material, and a plate for receiving the deposited zinc, substantially as set forth.

4. In a reversible galvanic cell, an alkaline zincate as the electrolyte, an oxygen-storing element containing finely-divided oxid of mercury, and a plate of magnesium for receiving the deposited zinc, substantially as set forth.

5. An electrode for a reversible galvanic cell, comprising a receptacle having perforated walls and an active material mixed with flake-graphite in said receptacle, the bulk of the particles of the graphite being larger than such perforations, substantially as set forth.

This specification signed and witnessed this 22d day of December, 1900.

THOMAS A. EDISON.

Witnesses:
J. F. RANDOLPH,
FREDERICK C. DEVONALD.